Oct. 10, 1950     W. H. KUNTZ     2,525,606
DEVICE FOR DESCRIBING CURVED OR STRAIGHT LINES
Filed Sept. 6, 1947
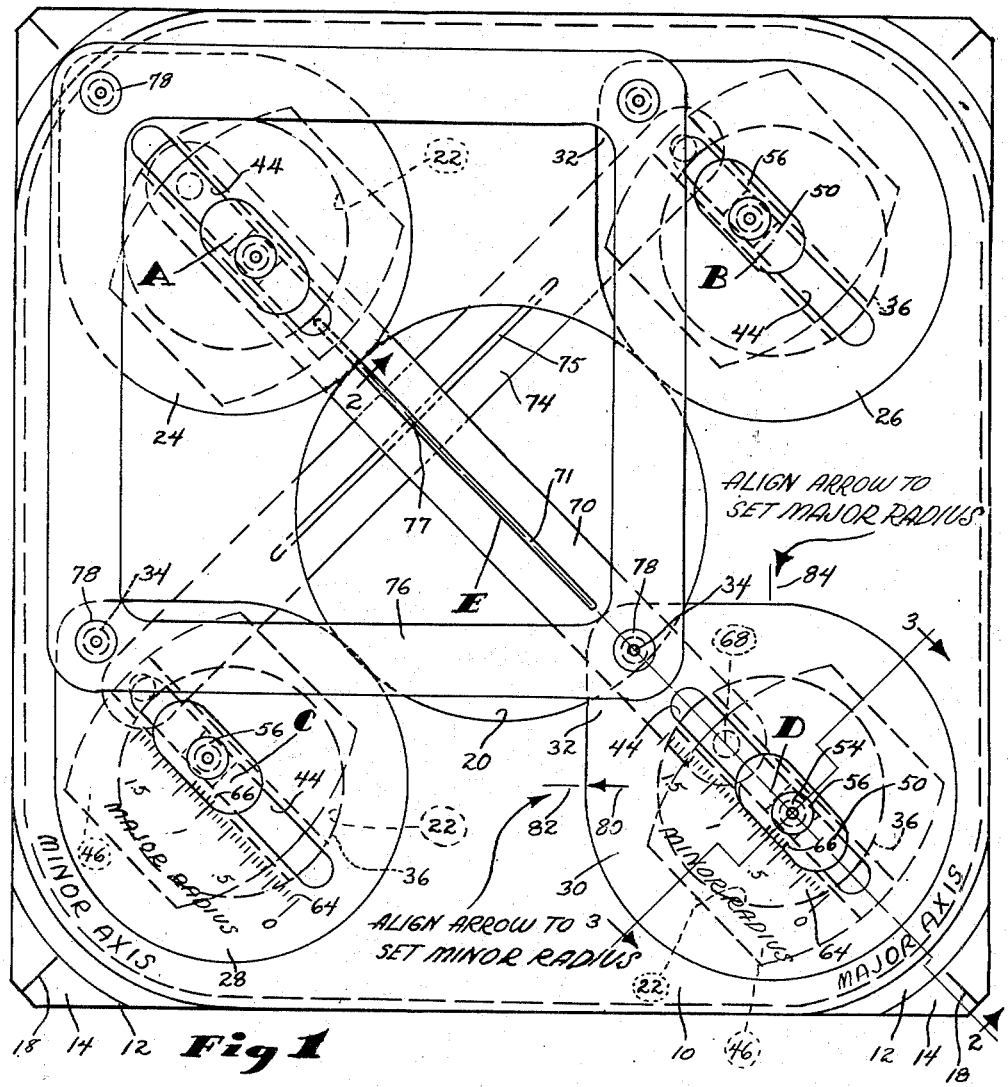
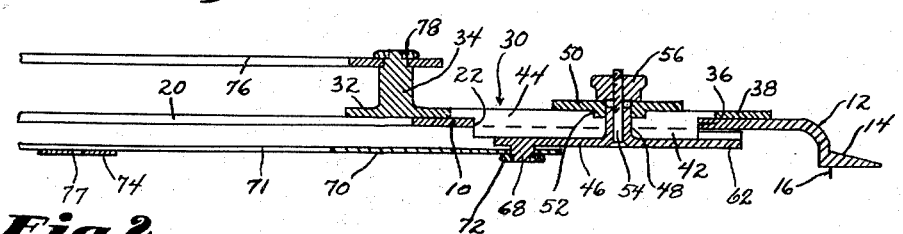
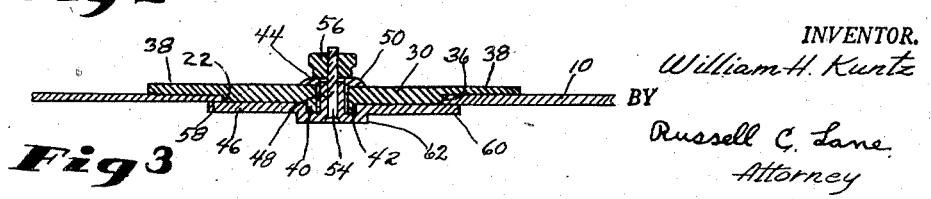
INVENTOR.
William H. Kuntz
BY
Russell C. Lane
Attorney Patented Oct. 10, 1950

2,525,606

UNITED STATES PATENT OFFICE 2,525,606

DEVICE FOR DESCRIBING CURVED OR STRAIGHT LINES

William H. Kuntz, Dayton, Ohio

Application September 6, 1947, Serial No. 772,555

10 Claims. (Cl. 33—30)

This invention relates to geometric instruments, and is principally concerned with a device for accurately drawing a plurality of elliptical figures about a common center point without the need for moving the instrument for the purpose of resetting for different combinations of major and minor diameter.

One object of the invention is to provide an instrument for drawing ellipses that is easy to accurately spot or locate over the center of the figure to be drawn.

Another object of the invention is to provide an instrument that can be adjusted to different sized figures from the top thereof after the instrument has been located and without moving the instrument from the paper.

Another object of the invention is to provide an instrument for drawing ellipses, which can be adjusted on both the major and minor axes to within one hundredth of an inch.

Another object of the invention is to provide an instrument with which the operator can draw a great many ellipses of different dimensions about a single central point without moving the instrument from the paper.

Another object of the invention is to provide an instrument with which to draw ellipses of any proportion ranging from a full circle to a straight line or edge view of a circle, and of any size from zero or a point up to the maximum physical capacity for which the instrument is constructed, there being no theoretical limitations as to the maximum size.

Another object of the invention is to provide an instrument for describing ellipses and the like by guiding a pen point of the "Wrico" type, or other pencil pointed type of scriber, through the movable intersection of slotted bars, thus eliminating the need of sharpening, fitting and carefully adjusting specially equipped tracing pointers.

Another object of the invention is to provide a geometric instrument of the class described that has journal bearings for movable parts that are of large diameter, slightly larger than the maximum radius of the largest desired figure to be drawn.

Another object of the invention is to provide disc bearings for moving parts of the device so that back-lash and lost motion may be reduced to a minimum, and the accuracy of the instrument enhanced.

Yet another object of the invention is to provide an instrument composed of a minmum number of parts, that are susceptible of being molded from a suitable plastic for inexpensive construction.

Still another object of the invention is to provide a geometric instrument for accurately drawing elliptical figures, which instrument is compact, and self bounded in that the sweep of the mechanism is confined wholly within the perimetric confines of the supporting base.

Among the final objects of the invention is that of providing an instrument for drafting elliptical figures, that is compact and so simply designed as to be adapted for manufacture from stampings of sheet material without depriving the completed instrument of its efficiency or high degree of accuracy.

I am familiar with the fact that there are many devices that have been designed to draw, or assist in drawing elliptical figures, and I have carefully studied their advantages and faults, and find that they are all vitally deficient in meeting the needs for an instrument to satisfy the exacting requirements of a draftsman or engineer. The instruments available are too expensive for those in other than corporate employ, and their limits of performance soon relegate them to the shelf of discards after a few disappointing trials. The most of the instruments available and designed in the patent literature are unwieldly, difficult to set and adjust, and after being adjusted, are difficult to exactly locate on the paper or other work where they are to be used. With some of them it is not possible to locate the instrument so that the figure to be drawn can be spotted with reference to other structure. With other devices, it is necessary to clear the decks for a considerable area around the location of the instrument so that sweeping arms will not be interfered with, and so that ink bottles and the like will not be upset. Still other devices are so extensive that considerable drafting board expanse is needed outside of the spot at which the figure is to be drawn that the use of the instrument becomes impractical if not impossible. Yet other instruments of the class, even though desirable in other respects, stand so high from the work surface that they are insecure in their setting, and so inaccurate in their scribing that they are not at all reliable. Many of the devices have the common fault that they must be picked up from the board and turned bottom side up to make the various adjustments, making it practically impossible to draw different figures successively about the same center point without moving the instrument from the paper.

After using and analyzing many devices, both physical and theoretical, I overcome their objections and accomplish the above and other objects by using a sheet like square base with short stout depending portions at the corners for support which provides a shallow chambered base housing much of the working mechanism and providing the means for guiding the scribing point that is close to the work sheet. The means for guiding the scribing point, which may be any standard pencil, consists of a pair of slotted links or bars crossing at right angles and each link is driven by crank arms at each end having a length to match the major or minor radius of the elliptical figure to be drawn. These crank arms are infinitely variable from zero to the physical limits of the instrument and are selectively fixed at the top side of the base plate, because each crank arm is part of a clamp plate on the under side of the base that has a stem extending through a diametric slot of a crank plate journalled in each corner of the base plate, a scale with a vernier, assisting in setting and securing the adjustment of the crank arms. The crank plates above the base are journalled in openings substantially equal in diameter to the radius of the maximum figure capable of being drawn on the identical instrument, and a correlating member couples all of the crank plates so that they will all be oriented in the same direction and rotated coincidentally in the same direction while the figure is being drawn. A central opening in the base plate always spans the travel of the intersecting slots of the bars and makes it possible to use an ordinary pencil therein to trace the figure. An actual physical embodiment of the invention has been constructed that operates to draft elliptical figures of extreme accuracy, and whose height dimension for essential elements is confined to five eighths of an inch, and whose moving parts when operating do not sweep outside of the contour of the base.

The above and further objects and novel features will more fully appear in the specification when the same is read in connection with the accompanying drawing. It is to be expressly understood, however, that the drawings are for the purposes of illustration only and are not intended as a definition of the limits of the invention, reference for that being had to the appended claims.

In the drawings, wherein like reference characters refer to like parts throughout the several views:

Fig. 1 is a top plan view of a geometric instrument for drawing an ellipse, and embodying the invention disclosed herein.

Fig. 2 is a sectional view taken diagonally through the instrument as suggested by the line and arrows 2—2 of Fig. 1.

Fig. 3 is a sectional view at right angles thereto as indicated by the line and arrows 3—3 of Fig. 1.

Referring particularly to the drawings, 10 refers to a square sheet metal or plastic base member, the corners of which curve downwardly at 12 to join feet 14 for engagement with the paper or other work on which the instrument is to be used. The lower face of the feet 14 may anchor sharp pins 16 therein that will assist in anchoring the base member in place when it has been located so as to prevent the instrument from shifting laterally with respect to the center of the figure to be drawn. To assist in locating or spotting the instrument for any particular center, the upper face of the feet are scribed with index marks 18, the use of which will be apparent in due course.

The base member 10 also provides a central sight opening 20 spanning the largest figure that may be drawn, and at each corner of the upper face there are large diameter circular openings 22 situated on centers A, B, C, and D which are equally distant from the center E of the sight opening 20 and equi-angularly spaced about that center, the openings 22 providing disc-like bearings for crank plates 24, 26, 28 and 30. The openings 22 are shown by dashed circular lines in Fig. 1 and are obviously located on the diagonals passing through the center E of the square base. Inasmuch as all of the crank plates are identical, the specific description here applied to crank plate 30, will suffice for the remaining three also.

The crank plates are essentially plate members of generally circular contour in plan with a web portion 32 transforming them to blunt tear-drop configuration, there being posts 34 or pins attached to or projecting upward from the web 32, as will presently appear. At the center of the crank plates there is a depending circular or disc portion 36 having a large diameter bearing of close fit within the base opening 22 in the form of journals. The circular or disc portion 36 being located in the center of the crank plate leaves a flange 38 that contacts the upper face of the base member 10 all around the edge of the opening 22, while the disc 36 extends through the opening 22 to provide a pair of flanges 40, 42 on either side of a diametric slot 44 lined up with the center D and the post or pin 34. The crank plate 30, as also the others, is maintained in proper position by a clamp plate 46 that has a central hollow stud 48 extending through the crank plate so as to traverse the length of the slot 44, an elongated washer 50 having a central enlargement 52 fitting over the top end of the stud 48 with flange portions engageable with the upper face of the crank plate 30, the enlargements 52 engaging within the slot 44 of the plate. A screw or stud 54 anchored in the clamp plate 46 and passing upwardly through the hollow stud 48 and the washer 50 where it is fitted with a thumb nut 56 offers a convenient means for securing the clamp plate at any selected point along the slot 44.

By placing the bearing openings 22 in the corners of the square base, and making them as large as possible, say equal in diameter to the radius of the central opening 20 and closely fitting the disc portions 36 of the crank plates, it is possible to make the bearings substantially wobble free despite their very short axial length. That is greatly enhanced by making the flange 38 of the crank plate wide so as to engage a substantially large area on top of the base member 10, and holding it in contact therewith by the clamp plate 46 with its flange that engages the under side of the base member as shown at 58 and 60 in Fig. 3, when the two plates are clamped together as stated. Preventing the bearings from wobbling eliminates a great deal of lost motion and improves the accuracy of the instrument.

The clamp plate 46 is larger in diameter than the diameter of the openings 22 so that both surfaces of the base member 10 will be clamped between the overlapping portions of the elements 38 and 46 somewhat as shown in Fig. 3, at 58 and 60. The clamp plate 46 is kept from rotating relative to the crank plate 30 by a medial off-set portion 62 that forms a groove receiving the flanges 40 and 42 of the plate 30 that bound the slot 44. By loosening the nut 56 the clamp plate 46 may slide along the diameter of the plate to any point within the limits of the slot 44 and stud 48. On one crank plate of each diagonal pair, there is provided a scale 64 of graduations along one edge of the slot 44, and on the adjacent edge of the elongated washer 50 a vernier scale 66 is affixed so that the relative setting of the crank plate 30 and the clamp plate 46 may be fixed at small fractions of a scale unit. The scale 64 is so arranged here as to read in inches and twentieths of inches extending from one end of the slot 44 toward the post or pin 34, while the scale 66 on the washer 50 divides a space of four twentieths of the scale 64 into five equal parts, therefore making it possible to make the settings to one hundredth of an inch. When the stud 48 is moved to the extreme right hand end of the slot 44 as shown in Fig. 2 then both of the zero points of the scales 64 and 66 will coincide. At that setting, a depending circular post 68 extending from the bottom of the clamp plate 46 will be concentric with the center D of the crank plate 30. The post 68 is stepped in diameter to receive one end of a link 70 where it is maintained in pivotal relation by a washer or collar 72 secured in any preferred manner.

As is shown in Fig. 1, the link 70 extends beneath the base member 10 across the sight opening and in a diagonal direction to similarly connect to the post 68 of the crank plate 24 rotatable around the center A. Similarly, a link 74 is connected to the posts 68 of the crank plates 26 and 28 rotatable about the centers B and C. Both of the links 70 and 74 are longitudinally slotted as shown at 71 and 75 respectively. Since the links connect diagonally opposite crank plates, the links always cross one another, and the slots will intersect at some point within the sight opening 20 as indicated generally at 77. The crank plates 24 to 30 are linked together by a correlating member 76 that here takes the form of a square ring the corners of which are apertured to receive the reduced end of posts 34 where collars or washers 78 are affixed to provide rotation between the post and correlating member.

With the elements of structure thus fashioned, constructed and assembled, the instrument is ready for use in drawing an ellipse of any dimension and relation of axes within its maximum limitation. The crank plates 24 and 30 are situated on the major axis while the crank plates 26 and 28 are centered on the minor axis. The cranks 34 all are pivotally connected to the correlator 76 such that any rotary movement of one crank plate within the opening 22 of the plate 10 will effect equal rotation in the same direction of all the other crank plates, and will effect a movement of the intersecting point 77 dependent upon the setting of the clamp plates along their respective grooves 44. To assist the operator in setting the slides for either axis, one of the crank arms, such as 30 is provided with an index arrow 80 that is capable of coinciding with a base mark 82 for the smaller axis and with a second base mark 84 for the larger axis.

In making the settings, the operator rotates the crank plates, by moving the correlator 76 until the arrow 80 coincides with the base mark 82, whereupon he loosens the thumb screws 56 for the crank plates 24 and 30, and then slides the link 70 with its attached clamp plates 46 along the slots 44 until the graduations of scales 64 and 66 so coincide as to give him the minor radius required. Both of the thumb screws 56 on the two crank plates are now tightened. Then the crank plates are rotated to a ninety degree position so that the arrow 80 coincides with the second base mark 84, which places the slots 44 of the crank plates 26 and 28 in alignment with the link 74 and positions all of them over the diagonal running through the centers B, E, C. The thumb screws 56 on the crank plates 26 and 28 are then loosened so that the clamp plates 46 may be moved to take up a position desired and indicated by the scales 64 and 66 of the crank plate 28. When the thumb screws 56 are tightened the device will be adjusted for drawing an ellipse whose major and minor axes are determined by the setting on the scales of the crank plates 28 and 30. Having drawn a vertical and a horizontal line through the point desired for the center of the ellipse to be drawn, the adjusted device is now spotted over the paper by aligning all of the index marks 18 on the top of the feet 14 with the horizontal and vertical lines running through the selected point, such that the major and minor axes as indicated by the legend on the base 10 coincide with the major and minor axes of the desired ellipse. Slight downward pressure on the top of the instrument sinks the sharp pins 16 into the paper far enough to prevent the instrument from shifting laterally or off center while the figure is being drawn. After the instrument is spotted over the center of the figure to be drawn, a sharp pencil is placed at the intersection 77 of the slots 71 and 75 and pressed upon the paper, while a rotary movement of all of the crank plates is effected by revolving the correlating member 76. That movement will cause the pencil at the intersection 77 of the slots 71, 75 to trace out an elliptical figure having major and minor radii determined or set by the scales on the crank plates 28 and 30.

If the scales for one of the linked crank arms is set at zero with the scales for the other pair set for some other value, then revolution of the correlating member for driving the crank plates will effect the tracing of a straight line by a pencil point in the intersecting slots as the movement is made. If on the other hand both of the scales are set at zero then driving of the crank plates effect a trace of a single point by a pencil placed in the intersecting slots of the links. Again, if the scales for both pair of linked crank plates are set for the same value, then driving of the crank plates will cause a pencil placed at the intersection of the slots to trace a circle whose radius is that determined by the setting of the scales. Thus, to draw an ellipse of any ratio of axes ranging from a circle to a straight line, the radius values of the axes are set on the appropriate scale by assistance of the verniers, and the device operated with any suitable scribing point at the slot intersection. During the revolution of the correlating member, there is never any part of the moving structure above the base member 10 that sweeps beyond the perimeter or boundary line of the base member 10, so that there is never any danger of the moving parts coming into contact with bottles of ink, models, books or other articles carelessly left near the instrument, and which might cause displacement or shifting of the instrument from its spotted or selected position. If it is desired to draw a second or other ellipses on the same center point, the adjustment of the slides on the crank arms can be made easily without disturbing the location of the instrument over the center, and even without lifting the instrument from the paper. While the drawings illustrate the scales on the crank plate 28 as pertinent to the major radius, and the scale on the crank plate 30 as for the minor radius, it is obvious that these scales may in fact be reversed if it appears necessary to do so in order to draw an ellipse with the major axis at right angles to that first drawn, and it is not desired to lift the instrument from the paper.

Although a specific embodiment of the invention has been shown for the purposes of illustration, it will be evident that the invention is capable of various modifications and adaptations within the scope and spirit of the appended claims.

What is claimed is:

1. In an instrument for drawing geometric figures, the combination comprising, a rectangular plate of sheet-like material having depending corner portions forming legs for supporting the plate above the paper, a central sight opening through the plate through which the figure to be drawn may be seen, large diameter bearing openings in each corner of the plate, said bearing openings having a diameter substantially equal to the radial dimension of the central opening, a plurality of crank plates each having a disc portion journalled in one of the corner openings of said plate, a correlating member pivotally engaging the crank plates, said crank plates having diametric slots aligned with the center thereof and with the pivotal connection between the correlating member and crank plate, clamp plates having studs extending through the slot of the crank plate and being shiftable the length thereof, means fixing the clamp plate to the crank plate at the selected point, and slotted links pivotally connecting diagonally disposed clamp plates.

2. In an instrument for drawing geometric figures, the combination comprising, a substantially square base plate having depending corner portions turned outwardly to provide feet and being scribed to furnish locating marks, a flanged disc journalled for rotation in each corner of the square plate and located equidistant from the center of the base plate on the diagonals of the plate and having the centers of the discs aligned with the scribed marks on diagonally disposed feet, said flanged discs having posts as eccentric portions to the centers of the discs, a correlating member pivotally connecting the eccentric portions of all of the flanged discs, a clamp plate for each flanged disc and having a central stud and an eccentrically located crank stud, said flanged discs providing diametric slots receptive of the central stud of the respective clamp plate for sliding movement therein, means for securing the central stud at a selected position along the length of the slot, slotted links connecting the crank studs of diagonally opposed clamp plates, said base plate having a central opening therethrough exposing the intersection of said slotted links.

3. In an instrument for drawing elliptical figures, the combination comprising, a square plate having depending corner portions to provide legs for supporting the plate in spaced relation to the paper, a large central opening through the plate for observing the figure being drawn, circular openings in each corner of the plate substantially equal in diameter to the radius of said central opening, crank plates disposed on top of the plate and having disc portions journalled for rotation in each of said corner openings, clamp devices beneath the square plate for retaining the crank plates in bearing relation and having crank posts depending therefrom, said crank plates and clamp devices engaging opposite sides of the square plate to prevent lost motion and backlash in the bearings, slotted links each connected at one end to a crank post of diagonally situated clamp devices, shiftable means for selecting and fixing the crank posts of diagonally situated clamp devices at predetermined distances from the center of crank plate journals, means for orientating and coincidentally cranking the crank plates, and means for coincidentally cranking the clamp devices with the cranking of the crank plates whereby the intersection of the slots in the links describes an elliptical figure designated by the selected settings of the clamp devices.

4. In an instrument for drawing elliptical figures, the combination comprising, a plate-like base member having a central sight opening and equally angularly spaced circular corner openings, a plate with a disc portion journalled in each corner opening, keeper plates beneath the base member secured to each disc portion, crank studs depending from the keeper plates, means for adjusting the crank studs to different positions along the radius of each disc, slotted links connecting diagonally opposite crank studs and intersecting within the boundary of said central sight opening, and means for equally and simultaneously rotating the disc plates.

5. An instrument for drawing ellipses with an ordinary pencil, comprising a base plate having a central opening, a set of four rotatable assemblies journalled in said base plate and equiangularly spaced about said opening, each of said assemblies comprising a crank plate of blunt tear-drop contour above the base plate and having a large diameter disc portion journalled in the base plate, each said crank plate having a slot extending therethrough throughout the diameter of the disc portion, a clamp plate beneath the base plate having a stem extending upward through said slot, a washer cooperating with said slot and stem and a screw device for securin said stem at any adjusted position along said slot, crank pins extending downward from said clamp plates, and slotted links pivotally connecting diagonally opposed clamp plates beneath the base plate, said slotted links always crossing within the confines of the central opening of said base and the intersection of said slots being receptive of a pencil point contacting the paper, and means above the base plate for simultaneously rotating all of the rotatable assemblies.

6. An instrument for drawing ellipses, comprising in combination, a square base plate having a central opening, short legs supporting the base plate closely spaced from the paper, a rotatable assembly providing a disc-like portion having a bearing in each corner of the base plate, said rotatable assembly including a clamp plate adjustable along the diameter of the respective assembly, means above the base plate for adjusting and securing the clamp plates to the rotatable assembly, link means beneath the base plate connecting eccentric points of diagonally opposed clamp plates, said links having slots intersecting within said central opening for reception of a pencil point contacting the paper, and means above the base plate for coincidentally rotating the assemblies.

7. An instrument for drawing ellipses, comprising in combination, a square base plate having a central opening, means at the corners of the base plate supporting it closely spaced from the paper, scribe marks on the upper side of said means defining the diagonals passing through said base plate, a large central opening through the base plate centered on the intersection of said diagonals, rotatable assemblies journalled in the base plate at equal distances from the center of said opening and on said diagonals, clamp means beneath the base plate retaining the assemblies in their journals, a depending post from said clamp means, slotted links connecting the depending posts of diagonal clamp means, means for selectively securing the depending posts of diagonal assemblies as pairs at different distances from the center of the rotatable assemblies, and means above the base plate for simultaneously and equally rotating said assemblies.

8. An instrument for drawing ellipses, comprising in combination, a square base plate having a central opening, cranking assemblies symmetrically disposed about the central opening, each assembly including a crank plate providing a depending circular disc portion journalled for rotation in said base plate, clamp plates clamped to the underside of said crank plate and providing depending studs said crank plate having a diametric slot, and said clamp plate having a stud disposable along the slot of the crank plate, rib and channel means between the crank plate and clamp plate preventing relative rotation thereof, said depending stud being disposed over the plate slot and slidable to coincide with the center of said journals or assume a position outside of the periphery of said journal, slotted links pivotally connecting the depending studs of diagonally disposed clamp plates, the slots in the links of one pair of clamp plates crossing the slot of the other within the opening of the base plate central opening, and means operable from above the base plate including a vernier device for selectively setting the adjustment of the clamp plates on the crank plates of each linked pair so that elliptical figures may be drawn at infinite adjustments ranging from a straight line to a complete circle.

9. In a geometric instrument for drawing oval figures on paper, a compact assembly hovering close to the paper and providing a substantially square base plate, a plurality of rotatable assemblies providing a relatively large disc-like portion having a diametrically arranged slot, a flange bounding one end of the disc portion, a crank pin upstanding from said flange, circular holes in each of the four corners of said square base adapted to journal said disc-like portions with relatively large bearing surfaces, said rotatable assemblies when assembled with the base having their flanges engaging the upper surface of the base with the disc-like portion extending downward through the said circular holes of said base, a clamp plate beneath the base and having a depending stud ending close to the surface of the paper, means securing the clamp plate to the under side of the rotatable assembly with the edge of the clamp plate engaging the underside of the base outside of the circular hole, means adjustably securing the clamp plate along the slot of the rotatable assembly and for rotating the clamp plate when the rotatable assembly rotates, slotted links connecting the depending studs of diagonally situated clamp plates and crossing each other in close proximity to the paper, a single member connecting the crank pins of all the rotatable assemblies above the base whereby all rotatable assemblies may be driven coincidentally, and such that, a pencil point disposed in the intersection of the slotted links will describe an oval figure on the paper when the rotatable assemblies are driven through one revolution.

10. In a geometric instrument for drawing oval figures on paper, a compact unit hovering close to the surface of the paper and providing a substantially square base plate, a plurality of rotatable assemblies providing a relatively large disc-like portion having a diametrically arranged slot, a flange bounding one end of the disc portion, said base providing large diameter openings in each corner thereof for journalling the disc-like portions of the rotatable assemblies while the flange of each assembly rotatably engages the upper surface of said base plate, a crank pin upstanding from the edge of each flange, and a ring-like member pivotally connecting each crank pin so that all assemblies may be rotated in unison, clamp plates beneath the base adjustably secured in the slots of the disc-like portions and having depending studs, slotted links extending diagonally beneath the base and crossing to pivotally connect diagonally opposite studs, and supporting means for the base plate holding the crossed slotted links just above the surface of the paper whereby a pencil point inserted at the intersection of the slots will describe an oval figure when the assemblies are rotated.

WILLIAM H. KUNTZ.

REFERENCES CITED

The following references are of record in the file of this patent:

UNITED STATES PATENTS

| Number | Name | Date |
| --- | --- | --- |
| 256,462 | Clark | Apr. 18, 1882 |
| 511,772 | Harrer | Jan. 2, 1894 |
| 520,003 | Lehner | May 15, 1894 |
| 918,218 | Sundman | Apr. 13, 1909 |
| 2,025,842 | Africano | Dec. 31, 1935 |